(12) United States Patent
Liao et al.

(10) Patent No.: US 8,301,736 B2
(45) Date of Patent: Oct. 30, 2012

(54) METHOD FOR SELECTING AND CONFIGURING NETWORK SUPERNODES

(75) Inventors: Jianxin Liao, Beijing (CN); Jing Wang, Beijing (CN); Chun Wang, Beijing (CN); Wei Li, Beijing (CN); Li Wan, Beijing (CN); Xiaomin Zhu, Beijing (CN); Lei Zhang, Beijing (CN); Tong Xu, Beijing (CN); Lejian Zhang, Beijing (CN); Qiwei Shen, Beijing (CN); Limin Fan, Beijing (CN); Li Cheng, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 302 days.

(21) Appl. No.: 12/730,866

(22) Filed: Mar. 24, 2010

(65) Prior Publication Data

US 2011/0128889 A1 Jun. 2, 2011

(30) Foreign Application Priority Data

Dec. 1, 2009 (CN) .......................... 2009 1 0250017

(51) Int. Cl.
*H04L 12/28* (2006.01)
(52) U.S. Cl. .......................... 709/220; 370/254; 370/255
(58) Field of Classification Search .................. 709/220, 709/222, 223, 224; 370/254, 255
See application file for complete search history.

(56) References Cited

U.S. PATENT DOCUMENTS

| | | | | |
|---|---|---|---|---|
| 7,370,101 B1 * | 5/2008 | Lakkapragada et al. | ...... | 709/223 |
| 2006/0187866 A1 * | 8/2006 | Werb et al. | ..................... | 370/311 |
| 2008/0069008 A1 * | 3/2008 | Park et al. | ..................... | 370/254 |
| 2009/0163137 A1 * | 6/2009 | Capparelli et al. | ........... | 455/3.06 |
| 2009/0194710 A1 * | 8/2009 | Shibata | ..................... | 250/492.2 |

FOREIGN PATENT DOCUMENTS

| | | |
|---|---|---|
| CN | 200610081402.4 | 10/2006 |
| CN | 200710003320.2 | 6/2009 |
| CN | 200710176639.5 | 12/2009 |
| JP | 11219374 A * | 8/1999 |

OTHER PUBLICATIONS

Kim et al., Selective Sensor Node Selection Method for Making Suitable Cluster in Filtering-Based Sensor Networks. In Proceedings of ICIC (1). 2008, 636-643.*
Aslam et al., "Relay Node Selection in Randomly Deployed Homogenous Cluster-based Wireless Sensor Networks", in IProc. of Internation Conference on Sensor Technologies and Applications, 2007. 418-423.*
Hawick et al., Grid-Boxing for Spatial Simulation Performance Optimisation, Simulation Symposium, 2006. 39th Annual, vol., No., pp. 9 pp., Apr. 2-6, 2006.*
Sharma et al., Swarm Intelligence based Collision Avoidance Between Realistically Modelled UAV Clusters, American Control Conference, 2007. ACC '07, vol., No., pp. 3892-3897, Jul. 9-13, 2007.*

* cited by examiner

*Primary Examiner* — Quang N Nguyen
*Assistant Examiner* — Kostas Katsikis
(74) *Attorney, Agent, or Firm* — Marshall, Gerstein & Borun LLP

(57) ABSTRACT

A method for selecting and configuring network supernodes includes (i) in a first set period T1, each node, other than a control node in a network, regularly sending information on interactions between the node and other nodes to the control node; and (ii) in a second set period T2, the control node dividing the nodes into a plurality of node clusters according to the received information on interactions among the nodes and selecting supernodes from each node cluster, where each node belonging uniquely to a node cluster.

12 Claims, 5 Drawing Sheets

METHOD FOR SELECTING AND CONFIGURING NETWORK SUPERNODES

FIELD OF THE INVENTION

The present invention relates to the field of network communication technologies, and particularly to a method for selecting and configuring network supernodes.

BACKGROUND OF THE INVENTION

With the development of the Internet technologies, more and more applications have emerged over the Internet. To meet the requirements of the diversified applications, the network distribution technology based on the principle of Peer to Peer (P2P) network has been applied to a great extent. At present, in addition to ordinary network user computers acting as user nodes, control nodes and supernodes also need to be configured in a computer network based on the P2P technology. The control node functions to establish and carry out a control strategy, and control and manage the network through the supernodes. The supernode functions to particularly implement the management and control over the user nodes under the management of the control node.

In general, the supernode is implemented by a user computer having abundant resources. Therefore, how to select a supernode from numerous user computers and configure the same has become a key task that influences the function of a computer network. The issue regarding how to select and configure a supernode also exists in wireless communication networks.

At present, some solutions have been proposed to the above issue.

Chinese patent application No. 200710003320.2 in the name of Huawei Technology Co., Ltd., titled "Method, Device and System for Electing Supernode and Searching Network Node and Resource", discloses a method in which an ordinary node in a network compares the value of a performance parameter with a threshold specified in the conditions that an ordinary node can be a supernode (for example, CPU frequency and memory capacity, network width for the node, network delay of the node, total number of other nodes interacting with the node, online time of the node, total traffic with other nodes per minute, and average CPU utilization ratio and average memory utilization ratio during a predetermined period of time), and sends a message indicating that the node becomes a supernode to other nodes interacting with the node, when it is determined that the performance of the node meets the conditions that an ordinary node can be a supernode. This solution mainly takes into account the performance parameters of the node, but not the interactions between the node and other nodes. If the supernode needs to manage other user nodes, relative long time and path may be required for finding a corresponding user node, resulting in a too low working efficiency of the supernode.

Chinese patent application No. 200710176639.5 in the name of Beijing University of Aeronautics and Astronautics, titled "Method for Selecting P2P Network Supernode and Searching Resources Taking into Account Importance of Node", discloses a method including calculating importance of each node in a computing network from the number of neighboring nodes to the node and the importance of each of the neighboring nodes, and selecting a supernode according to the importance. Because the interactions among the network nodes change constantly in practice, for a dynamic network, this solution can only adjust the importance values of the nodes in the same time interval and select a supernode according to the adjusted importance values of the nodes. If the network changes faster (or slower), this solution can not shorten (or prolong) the adjustment period of the importance values of the nodes according to the actual network conditions, resulting in a low reactivity of the system to a change of the network, or greatly increased traffic in the network.

Chinese patent application No. 200610081402.4 in the name of Beijing University of Posts and Telecommunications, titled "Method for Implementing P2P Network with Dynamic Cell Allocation Technique", discloses a systemic method for exchanging and sharing information based on a P2P network, in which all users are managed based on dynamic cell allocation, a cell consists of ordinary nodes and is managed by an advanced node, and a supernode manages a certain number of advanced nodes. The size of a cell (i.e. the number of ordinary nodes in the cell) is set upon system initialization and is adjusted dynamically according to the total number of nodes in the cell. This solution does not take into account the interactions among all nodes in the network. When a change occurs in the interactions among the nodes, the cell allocation for users and the supernode selection can not be adjusted dynamically with the change in the actual network conditions, thus limiting the working efficiency of the supernode, and making it possible that the supernode can only implement management and control over user nodes with a relatively long searching time and path.

The same shortcoming of the above solutions lies in that they do not implement the following: dividing the network nodes into a number of node clusters according to the actual interactions among all the nodes in the network, and selecting nodes that have more resources and more interactions with other nodes from each node cluster as supernodes, which implements particular control and management over other nodes in the user node swarm or cluster to which it belongs, under the unified control of the control node. The so-called node cluster consists of a plurality of network nodes that have close interactions with one another.

When a supernode implements particular control and management over other nodes according to the above prior art solutions, the traffic will increase substantially. Moreover, the acquiring period of the interactions among the network nodes, the division and adjustment periods of the node clusters and the supernode selection can not be adjusted dynamically with a change in the actual network conditions. Therefore, how to improve the existing solutions of selecting and configuring supernodes in a network has become a new task for those skilled in the art.

SUMMARY OF THE INVENTION

In view of above, an object of the present invention is to provide a method for selecting and configuring supernodes, in which a control node divides, according to interactions among network nodes, the network nodes into a number of node clusters, each of which consists of network nodes that have close interactions with one another, the control node selects nodes that have more resources and more interactions with other nodes from each node cluster as supernodes, and the supernode implements control and management over other nodes in the node cluster to which the supernode belongs.

To attain the above object, the present invention provides a method for selecting and configuring supernodes characterized by including the following operational steps:

step 1: in a set period T1, sending, by each node other than the control node in a network, information on interactions between the node and other nodes in the set period to the control node regularly; and step 2: in a set period T2, dividing, by the control node, the nodes into a plurality of node clusters in an optimal way according to the received information on interactions among the nodes, and selecting supernodes from each node cluster, wherein each node belongs uniquely to a node cluster, and the period T2 is an integer number of multiples of the period T1.

Compared with the prior art, the advantageous effects achieved by the present invention are that according to the present invention, the control node acquires information on interactions among all network nodes in a network regularly, divides all the network nodes into a number of node clusters according to the closeness of interactions among the nodes, and selects nodes that have more resources and more interactions with other nodes as supernodes. Therefore, the supernode selection according to the inventive method takes into account the interactions between the node and other nodes, in addition to the performance and resource conditions of the node itself. In this way, when the supernode needs to implement the control and management over other network nodes in the node cluster to which the supernode belongs, the supernode can find the corresponding network node in a short time, thereby reducing the searching time and communication path and improving the working efficiency. Meanwhile, in the supernode selection according to the inventive method, various parameters involved therein such as the acquiring period of network node interaction information and the division and adjustment periods of node clusters can be adjusted dynamically according to the actual conditions of the interactions among the nodes in the network. Therefore, the method according to the present invention has good real time performance, fast reactivity to a network change and flexible extensibility.

DETAILED DESCRIPTION OF THE EMBODIMENTS

The present invention is further described in detail hereinafter with reference to the accompanying drawings and embodiments so as to make the objects, solutions and advantages thereof more apparent.

Figure 1:
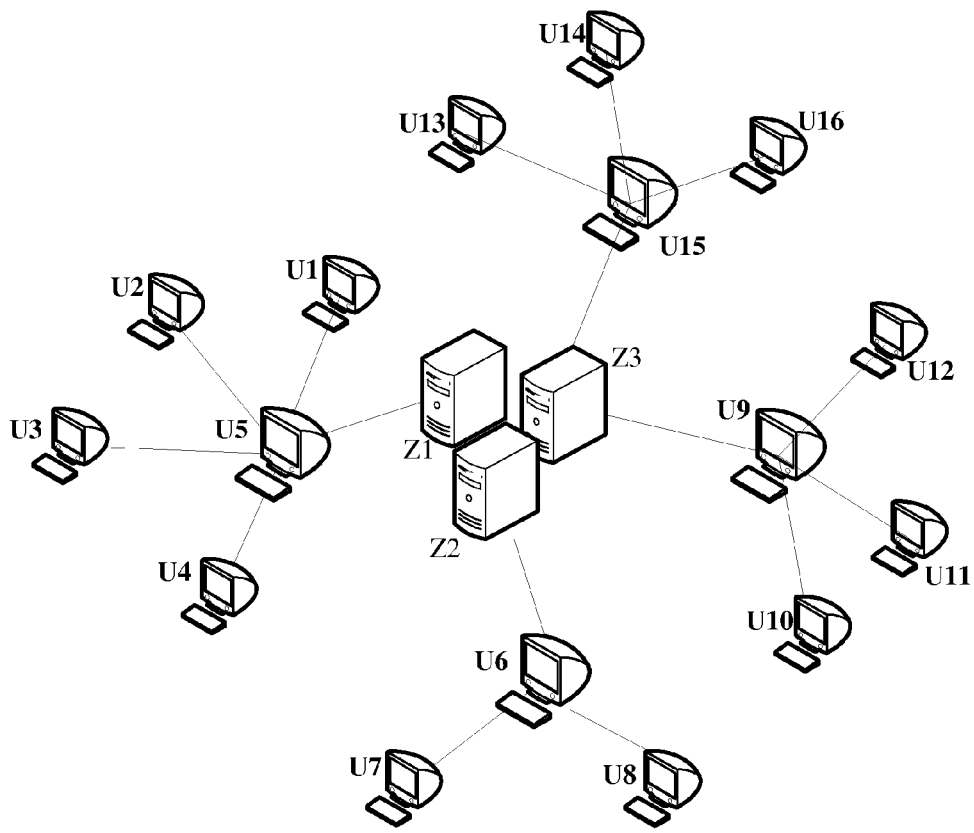
FIG. 1 is a schematic diagram illustrating the structure of a computer network according to an embodiment of the present invention after supernodes are selected and configured.

Referring to FIG. 1, there shows a schematic diagram illustrating the structure of a computer network according to an embodiment of the present invention after supernodes are selected and configured. Each user computer in the network acts as a node in the network and has a corresponding unique identification (ID), for example, U1, U2, U3, ..., U16 in the figure. Each node is connected to a server acting as a control node (for example, Z1, Z2, Z3) via the network. The three control nodes Z1, Z2 and Z3 connected with one another divide the nodes into a number of node clusters according to the interactions among the nodes. Each node cluster consists of nodes that have close interactions with one another. The control node selects nodes that have more resources and more interactions with other nodes from each node cluster as supernodes, and the supernode implements control and management over other nodes in the node cluster to which it belongs.

Figure 2:
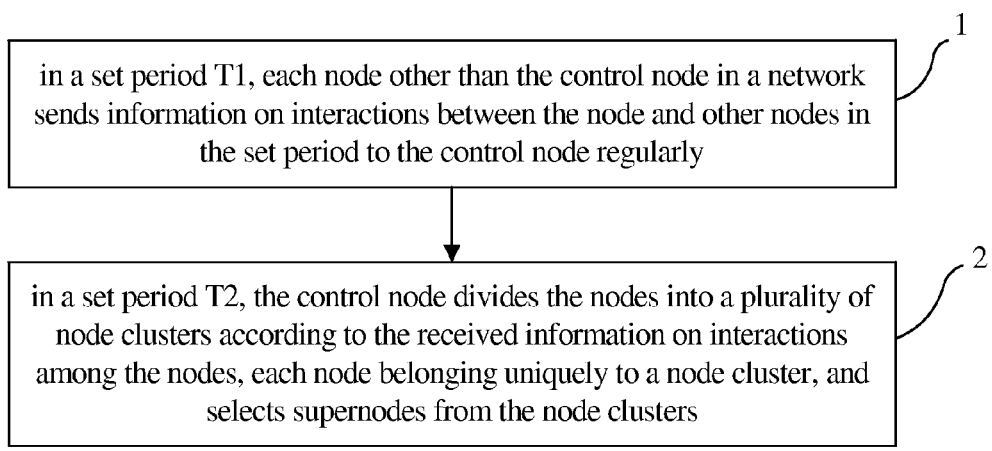
FIG. 2 is a flow chart illustrating the operations of a method for selecting and configuring supernodes according to the present invention.

Referring to FIG. 2, there shows a flow chart illustrating the operations of a method for selecting and configuring supernodes according to the present invention, which includes the following operational steps.

Step 1: In a set period T1, each node other than the control node in a network, sends information on interactions between the node and other nodes in the set period to the control node regularly.

For example, a network node U1 as shown in FIG. 1 reports information on interactions between it and other network nodes U2, U3, U4 and U5 in a period T1 to the control node regularly.

Step 2: In a set period T2, the control node divides the nodes into a plurality of node clusters in an optimal way according to the received information on interactions among the nodes, and selects supernodes from each node cluster, wherein each node belongs uniquely to a node cluster, and the period T2 is an integer number of multiples of the period T1.

The division into node clusters is in substance to group those network nodes that have close interactions among one another in a set period into a node cluster. If an interaction takes place between two network nodes, it can be deemed that there is an interaction edge between the two nodes. The density of interaction edges among the nodes in the same node cluster is greater than that in different node clusters. According to the present invention, the control node forms the node clusters according to the principle based on shortest description, i.e. encodes the different division results for node clusters possibly formed in the network through lossless compression and selects the division result that has the shortest encoding length as the optimal one.

Figure 3:
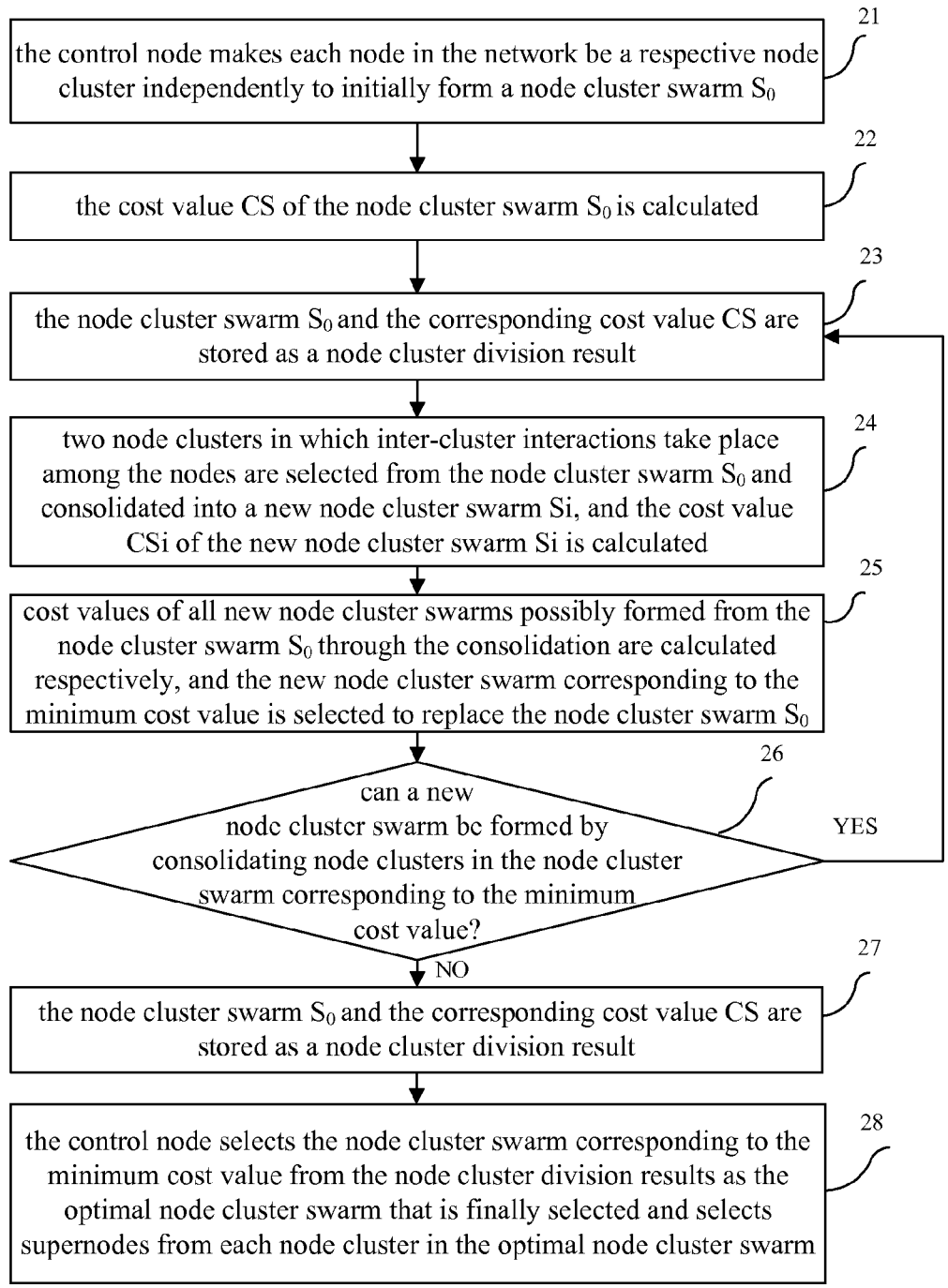
FIG. 3 is a flow chart illustrating the operations in which a control node divides nodes into node clusters in a set period and selects supernodes according to the method illustrated in FIG. 2.

Referring to FIG. 3, the specific operations of step 2, the key of the method according to the present invention, are detailed.

(21) The control node makes each node in the network be a respective node cluster independently to initially form a node cluster swarm $S_0$.

For example, a plurality of non-control nodes U1, U2, U3, U4, U5 . . . each constitute a respective node cluster independently. That is, the node cluster swarm $S_0$ may be represented as {{U1}, {U2}, {U3}, {U4}, {U5} . . . }, where each of {U1}, {U2}, {U3}, {U4}, {U5} . . . is a node cluster in the node cluster swarm $S_0$.

(22) The cost value CS of the node cluster swarm $S_0$ is calculated according to the formula:

$$CS = \log^* n + \log^* k + nH(p) + \sum_{i=1}^{k}(\log^*|E_i| + |g_i|H(g_i)),$$

where n is the total number of nodes in the network; k is the number of node clusters in the node cluster swarm $S_0$; $\log^* n$ and $\log^* k$ are the binary encoding lengths of n and k, respectively, calculated according to the formula:

$$\log^* x = \sum_{j=1} X(j), \quad X(1) = \log_2 x, \quad X(j+1) = \log_2 X(j), \quad X(j) > 0,$$

and j is a natural number; nH(p) is the binary encoding length of the node cluster to which each node belongs, $$H(p) = -\sum_{i=1}^{k} p_i \log_2 p_i, \quad p_i = \frac{n_i}{n},$$

$n_i$ is the number of nodes in the i-th node cluster $g_i$ in the node cluster swarm $S_0$, and $p_i$ is the probability that a node belongs to the i-th node cluster $g_i$; $|E_i|$ is the number of pairs of nodes that have interactions with each other in the i-th node cluster $g_i$ in the node cluster swarm $S_0$, the value of which depends on the statistics of the actual interaction information in the i-th node cluster $g_i$, and $\log^*|E_i|$ is the binary encoding length of $|E_i|$; and $|g_i|H(g_i)$ is the shortest description of the i-th node cluster $g_i$, $$|g_i| = \frac{n_i(n_i-1)}{2}, \quad H(g_i) = -(\rho_i \log_2 \rho_i + (1-\rho_i)\log_2(1-\rho_i)), \quad \rho_i = \frac{|E_i|}{|g_i|}.$$

If $n_i=1$, $\log^*|E_i|+|g_i|H(g_i)$ will be 0.

(23) The node cluster swarm $S_0$ and the corresponding cost value CS are stored as a node cluster division result.

(24) Two node clusters in which inter-cluster interactions take place among the nodes are selected from the node cluster swarm $S_0$ so as to be consolidated into a new node cluster to form a new node cluster swarm Si, and the corresponding cost value CSi of the new node cluster swarm Si is calculated according to the above formula.

For example, if an interaction takes place between the nodes U1 and U2 in the period T2, the control node can consolidate the node clusters {U1} and {U2} to which the nodes U1 and U2 belong, respectively, into a new node cluster to form a new node cluster swarm Si: {{U1, U2}, {U3}, {U4}, {U5} . . . }.

(25) According to the principle of selecting two node clusters in which inter-cluster interactions take place among the nodes for consolidation, all different new node cluster swarms possibly formed from the node cluster swarm $S_0$ are selected one by one, the cost values thereof are calculated respectively, and the new node cluster swarm corresponding to the minimum cost value is selected to replace the node cluster swarm $S_0$. If there are multiple new node cluster swarms having the same minimum cost value, one of them is selected randomly to replace the node cluster swarm $S_0$.

For example, besides that the node clusters {U1} and {U2} in the node cluster swarm $S_0$ may be consolidated into a new node cluster swarm S1: {{U1, U2}, {U3}, {U4}, {U5} . . . }, the node clusters {U1} and {U3} in the node cluster swarm $S_0$ may be consolidated into another new node cluster swarm $S_2$: {{U1, U3}, {U2}, {U4}, {U5} . . . }. Then the cost values CSi of all the new node cluster swarms Si (for example, $S_1$, $S_2$) formed through the consolidation are calculated according to the formula for calculating the cost value, and a comparison is made among all the cost values CSi so as to select the new node cluster swarm Si corresponding to the minimum cost value CSi to replace the node cluster swarm $S_0$.

(26) A determination is made as to whether a new node cluster swarm can be formed by consolidating node clusters in the node cluster swarm $S_0$ according to the above selection principle after being replaced with the new node cluster swarm corresponding to the minimum cost value. If yes, the flow returns to step (23), i.e. the control node continues to form a new node cluster swarm by consolidating node clusters and selects the new node cluster swarm $S_i$ corresponding to the minimum cost value to replace the node cluster swarm $S_0$ that is selected in step (25). Otherwise, step (27) is performed.

The new node cluster swarm $S_i$ corresponding to the minimum cost value selected in this step means in substance that close interactions take place among the nodes in the same node cluster in the new node cluster swarm $S_i$, and little or even no interactions take place among the nodes in different node clusters.

(27) The node cluster swarm $S_0$ and the corresponding cost value CS are stored as a node cluster division result.

(28) The control node finds the node cluster swarm $S_0$ corresponding to the minimum cost value from the node cluster division results as the optimal node cluster swarm that is finally selected and selects supernodes from each node cluster in the optimal node cluster swarm. The conditions of the supernode selection include interactions between a node and other nodes in each node cluster and various performance parameters of itself (including CPU frequency and memory capacity, transmission width for the node, network delay of the node, online time, total traffic with other nodes per minute, and average CPU utilization ratio and average memory utilization ratio during a predetermined period of time). A node that has more interactions with other nodes (when calculating the number of interactions between a node and other nodes, the number of control interactions between the node and the original supernodes should be excluded in advance) and better performance is selected as a supernode in each node cluster. Finding the optimal node cluster swarm corresponding to the minimum cost value from the node cluster division results by the control node indicates that all the non-control nodes have been divided in the optimal way according to the interactions among the nodes.

The cost value calculation in the above step (22) is further described below by way of example.

For example, assuming a new node cluster swarm $S_i$: {{U1, U2, U3, U4, U5}, {U6, U7, U8}} is formed through many consolidations according to the principle of selecting two node clusters in which inter-cluster interactions take place among the nodes for consolidation, n=8, k=2, $n_1$=5, $n_2$=3, $$H(P) = -\sum_{i=1}^{2} p_i \log_2 p_i = -\left(\frac{5}{8}\log_2\frac{5}{8} + \frac{3}{8}\log_2\frac{3}{8}\right).$$

For the first node cluster in the new node cluster swarm $S_i$:

$$\{U1, U2, U3, U4, U5\}, \ |E_1| = 6, \ |g_1| = 10, \ \rho_1 = \frac{3}{5},$$

and $$H(g_1) = -(\rho_1 \log_2 \rho_1 + (1-\rho_1)\log_2(1-\rho_1)) = -\left(\frac{3}{5}\log_2\frac{3}{5} + \frac{2}{5}\log_2\frac{2}{5}\right).$$

For the second node cluster in the new node cluster swarm $S_i$: $\{U6, U7, U8\}$, $|E_2|=3$, $|g_2|=3$, $\rho_2=1$, and $H(g_2)=-(\rho_2\log_2\rho_2+(1-\rho_2)\log_2(1-\rho_2))=-\log_2 1=0$. Therefore, the cost value CSi of the new node cluster swarm $S_i$ is:

$$CSi = \log^* 8 + \log^* 2 + 8\left(-\left(\frac{5}{8}\log_2\frac{5}{8} + \frac{3}{8}\log_2\frac{3}{8}\right)\right) + \\ \left(\left(\log^* 6 + 10\left(-\left(\frac{3}{5}\log_2\frac{3}{5} + \frac{2}{5}\log_2\frac{2}{5}\right)\right)\right) + \log^* 3\right).$$

The number of supernodes in each node cluster depends on the actual requirements of the network and may be one in general, but may also be two or more. For example, for an optimal node cluster swarm {{U1, U2, U3, U4, U5}, {U6, U7, U8}, . . . } that is finally selected, U5 and U6 are selected from {U1, U2, U3, U4,U5} and {U6, U7, U8} as supernodes, respectively, and the supernodes U5 and U6 are responsible for particularly implementing management and control over other network nodes in the node clusters to which they belong, respectively.

In the method according to the present invention, the two set periods T2 and T1 need to be adjusted dynamically separately according to the actual conditions of the interactions among the nodes in the network. This is because the traffic of the network will increase if the periods are set too short and the interaction change among the nodes cannot be reflected in time if the periods are set too long. According to the present invention, therefore, similar to the division into node clusters that is based on the shortest description principle, node clusters in two optimal node cluster swarms at adjacent points of time are divided into dynamic groups to form different dynamic group swarms possibly and the division result corresponding to the shortest binary encoding length is taken as the optimal dynamic group swarm. Then a determination is made as to whether the change tendencies of the node clusters in the dynamic groups of the optimal dynamic group swarm are consistent with each other at adjacent points of time. If yes, it is indicated that the change is smaller and the periods T2 and T1 need to be prolonged properly. Otherwise, the periods T2 and T1 need to be shortened properly.

Figure 4:
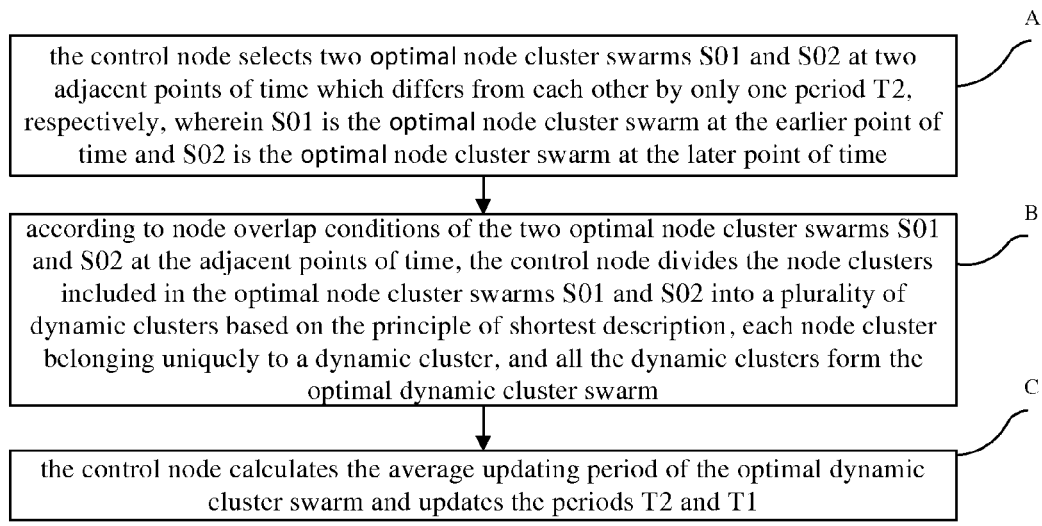
FIG. 4 is a flow chart illustrating the operations in which a control node adjusts periods T1 and T2 dynamically according to the actual network node interaction information in a method according to the present invention.

Referring to FIG. 4, the operational steps for adjusting two set periods T2 and T1 dynamically are described in detail.

Step A: The control node selects two optimal node cluster swarms S01 and S02 at two adjacent points of time which differs from each other by only one period T2, respectively, wherein S01 is the optimal node cluster swarm at the earlier point of time and S02 is the optimal node cluster swarm at the later point of time.

For example, an optimal node cluster swarm S01 at a point of time t is {c11, c12 . . . }, where c11, c12 . . . are node clusters in the optimal node cluster swarm S01, and c11 is {U1, U2, U3, U4, U5} and c12 is {U6, U7, U8}. An optimal node cluster swarm S02 at a point of time t+T2 is {c21, c22, c23 . . . }, where c21, c22, C23 . . . are node clusters in the optimal node cluster swarm S02, and c21 is {U1, U2, U5}, c22 is {U3, U4} and c23 is {U6, U7, U8}.

Step B: According to the node overlap conditions of the two optimal node cluster swarms S01 and S02 at the adjacent points of time, the control node divides the node clusters included in the optimal node cluster swarms S01 and S02 into a plurality of dynamic groups in an optimal way based on the principle of shortest description, each node cluster belonging uniquely to a dynamic group, and all the dynamic groups form the optimal dynamic group swarm.

Figure 5:
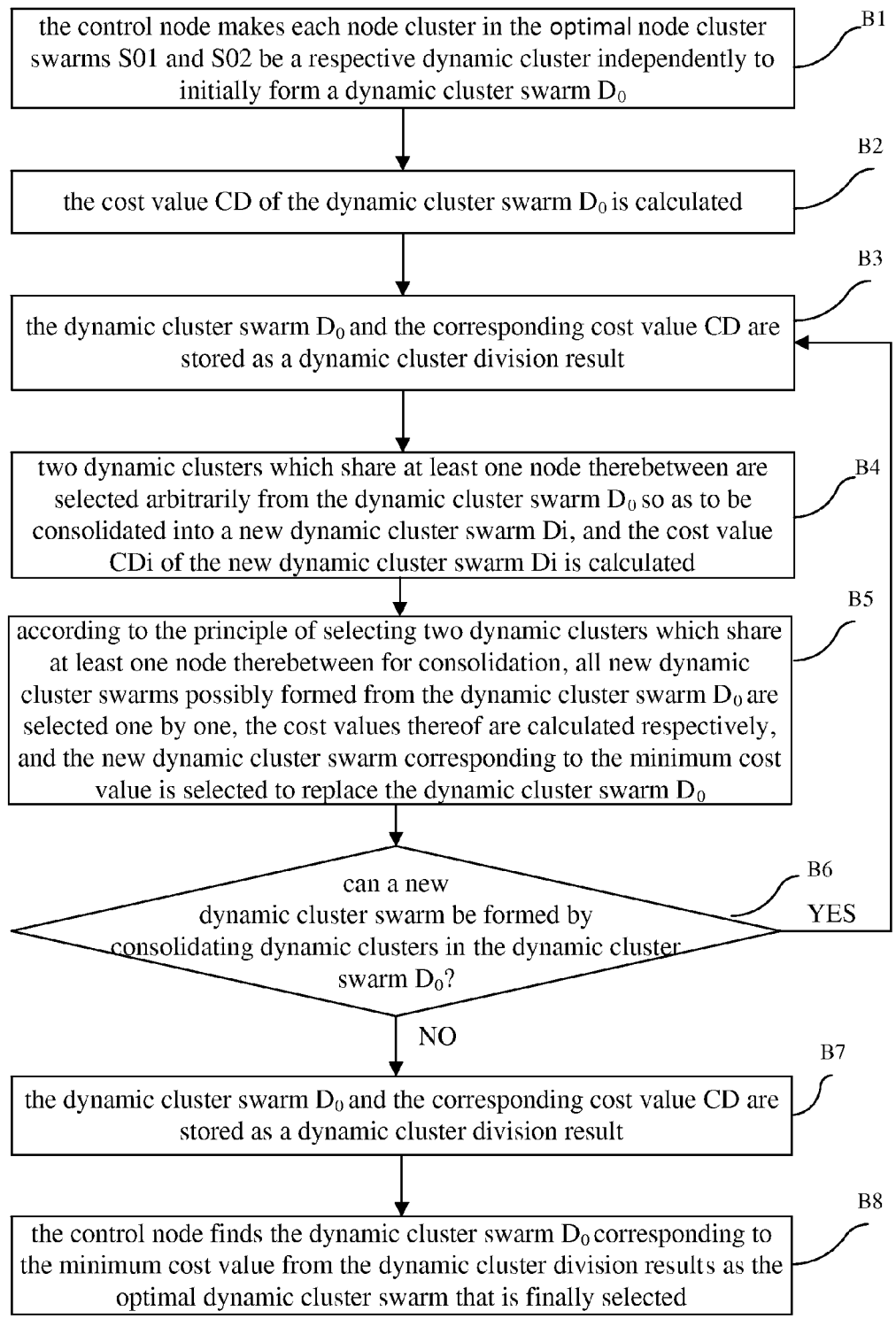
FIG. 5 is a flow chart illustrating the operations in which a control node forms dynamic groups according to the node overlap conditions of node cluster swarms S01 and S02 at adjacent points of time in a method according to the present invention.

Referring to FIG. 5, the specific operations of step B are detailed.

(B1) The control node makes each node cluster in the optimal node cluster swarms S01 and S02 be a respective dynamic group independently to initially form a dynamic group swarm $D_0$.

For example, a dynamic group swarm $D_0$ may be represented as {{c11}, {c12}, {c21}, {c22}, {c23} . . . }, where each of {c11}, {c12}, {c21}, {c22}, {c23} . . . is a dynamic group in the dynamic group swarm $D_0$.

(B2) The cost value CD of the dynamic group swarm $D_0$ is calculated according to the formula:

$$CD = \\ \log^* r + \log^* m + \log^* q + (m+r)H(s) + \sum_{i=1}^{q}(\log^* E(b_i) + |V_i^1| \times |V_i^2|H(b_i)),$$

where r and m are the total numbers of node clusters in the optimal node cluster swarms S01 and S02, respectively; q is the number of dynamic groups in the dynamic group swarm $D_0$; $\log^*r$, $\log^*m$ and $\log^*q$ are the binary encoding lengths of r, m and q, respectively, calculated according to the formula:

$$\log^* x = \sum_{j=1} X(j), \quad X(1) = \log_2 x, \quad X(j+1) = \log_2 X(j), \quad X(j) > 0,$$

and j is a natural number; (m+r)H(s) is the binary encoding length of the dynamic group to which each node cluster belongs, $$H(s) = -\sum_{i=1}^{q} s_i \log_2 s_i, \quad s_i = \frac{r_i}{m+r},$$

$r_i$ is the total number of node clusters in the optimal node cluster swarms S01 and S02 included in the i-th dynamic group bi in the dynamic group swarm $D_0$, and $s_i$ is the probability that a node cluster belongs to the i-th dynamic group $b_i$; $E(b_i)$ is the number of pairs of node clusters that have nodes overlapping with each other at adjacent points of time in the i-th dynamic group $b_i$ in the dynamic group swarm $D_0$, and $\log^* E(b_i)$ binary encoding length of $E(b_i)$; and $|V_i^1| \times$ $|V_i^2|H(b_i)$ is the shortest description of the i-th dynamic group $b_i$, $|V_i^1|$ is the number of node clusters belonging to the optimal node cluster swarm S01 in the i-th dynamic group $b_i$, $|V_i^2|$ is the number of node clusters belonging to the optimal node cluster swarm S02 in the i-th dynamic group $b_i$, $$H(b_i) = -(\alpha_i \log_2 \alpha_i + (1-\alpha_i)\log_2(1-\alpha_i)) \text{ and } \alpha_i = \frac{E(b_i)}{|V_i^1| \times |V_i^2|}.$$

If $r_i = 1$, $\log^* E(b_i) + |V_i^1| \times |V_i^2| H(b_i)$ will be 0.

(B3) The dynamic group swarm $D_0$ and the corresponding cost value CD are stored as a dynamic group division result.

(B4) Two dynamic groups which share at least one node therebetween are selected arbitrarily from the dynamic group swarm $D_0$ so as to be consolidated into a new dynamic group to form a new dynamic group swarm Di, and the corresponding cost value CDi of the new dynamic group swarm Di is calculated according to the above formula.

For example, if there is at least one node (for example 3 nodes: U1, U2 and U5) shared between the node cluster c11 in the optimal node cluster swarm S01 and the node cluster c21 in the optimal node cluster swarm S02, the dynamic groups {c11} and {c21} to which c11 and c21 belong, respectively, are consolidated into a new dynamic group swarm Di: {{c11, c21}, {c12}, {c22}, {c23} ... }.

(B5) According to the principle of selecting two dynamic groups which share at least one node therebetween for consolidation, all new dynamic group swarms possibly formed from the dynamic group swarm $D_0$ are selected one by one, the cost values thereof are calculated respectively, and the new dynamic group swarm corresponding to the minimum cost value is selected to replace the dynamic group swarm $D_0$. If there are multiple new dynamic group swarms having the same minimum cost value, one of them is selected randomly to replace the dynamic group swarm $D_0$.

For example, besides that the dynamic groups {c11} and {c21} may be consolidated into a new dynamic group swarm $D_1$: {{c11, c21}, {c12}, {c22}, {c23} ... }, the dynamic groups {c12} and {c23} may be consolidated into another new dynamic group swarm $D_2$: {{c11}, {c21}, {c12, c23}, {c22} ... }. Then the cost values CDi of all the new dynamic group swarms Di (for example, $D_1, D_2 \ldots$) formed through the consolidation are calculated according to the formula for calculating the cost value in step (B2), and a comparison is made among all the cost values CDi so as to select the new dynamic group swarm Di corresponding to the minimum cost value to replace the dynamic group swarm $D_0$.

(B6) A determination is made as to whether a new dynamic group swarm can be formed by consolidating dynamic groups in the dynamic group swarm $D_0$ according to the above selection principle after being replaced with the new dynamic group swarm corresponding to the minimum cost value. If yes, the flow returns to step (B3), i.e. the control node continues to form new dynamic group swarms by consolidating dynamic groups and selects the new dynamic group swarm $D_i$ corresponding to the minimum cost value to replace the dynamic group swarm $D_0$ that is selected in step (B5). Otherwise, step (B7) is performed.

(B7) The dynamic group swarm $D_0$ and the corresponding cost value CD are stored as a dynamic group division result.

(B8) The control node finds the dynamic group swarm $D_0$ corresponding to the minimum cost value from the dynamic group division results as the optimal dynamic group swarm that is finally selected and determines whether to update the two periods T2 and T1, according to the dynamic change tendency of the interactions among all the nodes in the optimal dynamic group swarm at adjacent points of time.

The cost value calculation in the above step (B2) is further described below by way of example.

For example, assuming a new dynamic group swarm Di: {{c11, c21, c22}, {c12, c23}} is formed through many consolidations according to the principle of selecting two dynamic groups that share at least one node therebetween for consolidation, r=2, m=3, q=2, $r_1$=3, $r_2$=2, $$H(s) = -\sum_{i=1}^{2} s_i \log_2 s_i = -\left(\frac{3}{5}\log_2 \frac{3}{5} + \frac{2}{5}\log_2 \frac{2}{5}\right).$$

For the first dynamic group: {c11, c21, c22}, when $E(b_1)=2$, $|V_1^1|=1$, $|V_1^2|=2$, and $\alpha_1=1$, $H(b_1)=-\log_2 1=0$. For the second dynamic group: {c12, c23}, when $E(b_2)=1$, $|V_2^1|=1$, $|V_2^2|=1$, and $\alpha_2=0$, $H(b_2)=-\log_2 1=0$. Therefore, the cost value CDi of the new dynamic group swarm Di is:

$$CDi = \log^* 2 + \log^* 3 + \log^* 2 + 5\left(-\left(\frac{3}{5}\log_2 \frac{3}{5} + \frac{2}{5}\log_2 \frac{2}{5}\right)\right) + (\log^* 2 + \log^* 1).$$

Step C: The control node calculates the average updating period of the optimal dynamic group swarm and updates the periods T2 and T1.

Figure 6:
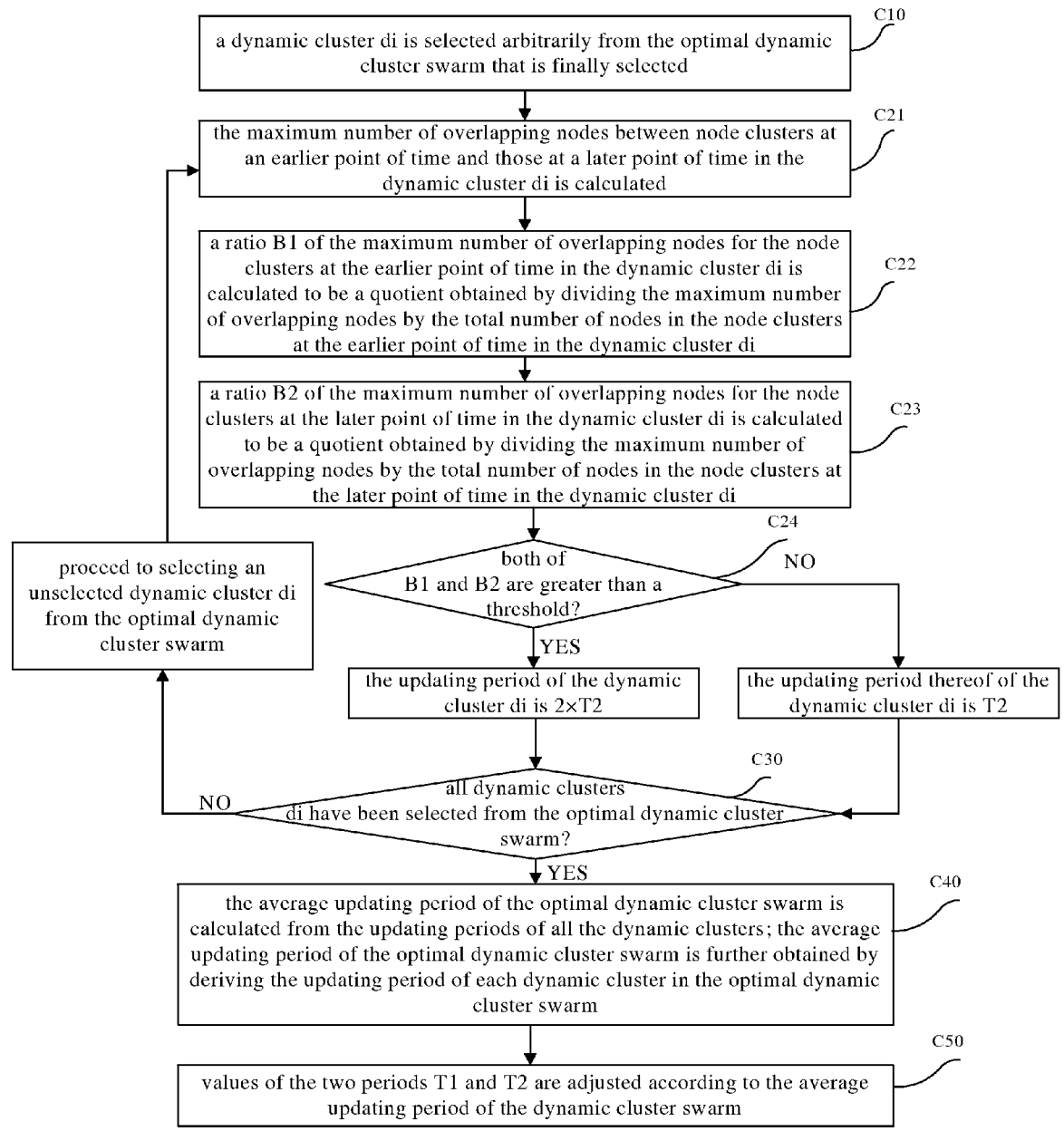
FIG. 6 is a flow chart illustrating the operations in which the control node calculates the average updating period L of a dynamic group swarm $D_0$ and updates set periods T2 and T1 in a method according to the present invention.

Referring to FIG. 6, the specific operations of step C are detailed.

(C10) A dynamic group di is selected arbitrarily from the optimal dynamic group swarm that is finally selected.

For example, in an optimal dynamic group swarm: {{c11, c21, c22}, {c12, c23} ... }, {c11, c21, c22} is dynamic group $d_1$, {c12, c23} is dynamic group $d_2, \ldots$.

(C20) A determination is made as to whether the dynamic group di is in a holding state, according to the node overlap conditions of node clusters at the adjacent points of time included in the dynamic group di. If yes, the updating period of the dynamic group di is calculated to be 2×T2. Otherwise, the updating period of the dynamic group di is calculated to be T2.

Here the specific operations of the determination as to whether the dynamic group di is in a holding state are described as follows.

(C21) The maximum number of overlapping nodes between the node clusters at the earlier point of time and those at the later point of time in the dynamic group di is calculated.

For example, for the dynamic group d1: {c11, c21, c22}, the number of nodes shared between the node cluster c11 at the earlier point of time and the node cluster c21 at the later point of time is 3, and the number of nodes shared between c11 and c22 is 2, then the maximum number of overlapping nodes between the node clusters at the earlier point of time and those at the later point of time in the dynamic group $d_1$ is 3. For the dynamic group $d_2$: {c12, c23}, the maximum number of overlapping nodes between the node clusters at the earlier point of time and those at the later point of time in the dynamic group $d_2$ is 3.

(C22) A ratio B1 of maximum number of overlapping nodes for the node clusters at the earlier point of time in the dynamic group di is calculated to be a quotient obtained by dividing the maximum number of overlapping nodes by the total number of nodes in the node clusters at the earlier point of time in the dynamic group di.

For example, the total number of nodes in the node clusters at the earlier point of time in the dynamic group $d_1$ is 5, and then B1 is 0.6. The total number of nodes in the node clusters at the earlier point of time in the dynamic group $d_2$ is 3, and then B1 is 1.

(C23) A ratio B2 of maximum number of overlapping nodes for the node clusters at the later point of time in the dynamic group di is calculated to be a quotient obtained by dividing the maximum number of overlapping nodes by the total number of nodes in the node clusters at the later point of time in the dynamic group di.

For example, the total number of nodes in the node clusters at the later point of time in the dynamic group $d_1$ is 5, and then B2 is 0.6. The total number of nodes in the node clusters at the later point of time in the dynamic group $d_2$ is 3, and then B2 is 1.

(C24) A determination is made as to whether both of B1 and B2 are greater than a threshold. If yes, it is indicated that the dynamic group di is in a holding state, and the updating period thereof is calculated to be 2×T2. Otherwise, it is indicated that the dynamic group di is not in a holding state, i.e. is in a changing state, and the updating period thereof is calculated to be T2.

The threshold is a real number selected from an interval [0,1] as required by the system. For example, when the threshold is 0.8, if the values of B1 and B2 corresponding to the dynamic group $d_1$: {c11, c21, c22} are both 0.6, which is less than 0.8, the updating period thereof is T2. Further, if the values of B1 and B2 corresponding to the dynamic group $d_2$: {c12, c23} are both 1, which is greater than 0.8, the updating period thereof is 2×T2.

(C30) A determination is made as to whether all the dynamic groups di have been selected from the optimal dynamic group swarm and the above operations have been performed thereon. If yes, the subsequent step (C40) is performed. Otherwise, the flow proceeds to selecting an unselected dynamic group di from the optimal dynamic group swarm and returns to step (C20).

(C40) The average updating period of the optimal dynamic group swarm is calculated from the updating periods of all the dynamic groups. That is, the average updating period of the optimal dynamic group swarm is further obtained by deriving the updating period of each dynamic group in the optimal dynamic group swarm.

For example, for an optimal dynamic group swarm: {{c11, c21, c22}, {c12, c23}}, if the updating periods of the dynamic groups are T2 and 2×T2, respectively, the average updating period of the optimal dynamic group swarm is $$\frac{T2 + 2 \times T2}{2} = 1.5 \times T2.$$

(C50) The values of the two periods T1 and T2 are adjusted according to the average updating period L of the optimal dynamic group swarm. For example, if L<2×T2, the period T2 is shortened, i.e. the period T2 is calculated based on the following formula: T2=φ×T2, where φ is a real number selected from an interval [0,1]; and otherwise, the period T2 is lengthened, i.e. the period T2 is calculated based on the following formula: T2=τ×T2, where τ is a real number larger than 1. And the period T1 is updated according to the relationship between T2 and T1 that T2 is an integral multiple of T1.

The applicant carried out many implementary simulating experiments on the method according to the present invention to prove the feasibility thereof. It can be seen through the data analysis on the experiment results that the implementary experiments were successful. The present invention can solve the shortcomings occurring in the prior art, achieving the objects thereof and relatively satisfactory technical effects.

What is claimed:

1. A method for selecting and configuring network supernodes, comprising:
  (1) in a first set period T1, sending, by each node other than a control node in a network, information on interactions between the node and other nodes in the first set period to the control node regularly; and
  (2) in a second set period T2, dividing, by the control node, the nodes into a plurality of node clusters according to the received information on interactions among the nodes, and selecting supernodes from each node cluster; wherein
  each node belongs uniquely to a node cluster, and the second set period T2 is an integer number of multiples of the first set period T1;
  wherein (2) comprises
  (21) making by the control node each node in the network be a respective node cluster independently to initially form a node cluster swarm $S_0$,
  (22) calculating the cost value CS of the node cluster swarm $S_0$ according to the formula $$CS = \log^* n + \log^* k + nH(p) + \sum_{i=1}^{k} (\log^* |E_i| + |g_i| H(g_i)),$$

where n is the total number of nodes in the network, k is the number of node clusters in the node cluster swarm $S_0$, $\log^* n$ and $\log^* k$ are binary encoding lengths of n and k, respectively, calculated according to the formula $$\log^* x = \sum_{j=1} X(j), \quad X(1) = \log_2 x, \quad X(j+1) = \log_2 X(j), \quad X(j) > 0,$$

and j is a natural number, nH(p) is the binary encoding length of the node cluster to which each node belongs, $$H(p) = -\sum_{i=1}^{k} p_i \log_2 p_i, \quad p_i = \frac{n_i}{n},$$

$n_i$ is the number of nodes in the i-th node cluster $g_i$ in the node cluster swarm $S_0$, and $p_i$ is a probability that a node belongs to the i-th node cluster $g_i$, $|E_i|$ is the number of pairs of nodes that have interactions with each other in the i-th node cluster $g_i$ in the node cluster swarm $S_0$, the value of which depends on the statistics of the actual interaction information in the i-th node cluster $g_i$, and $\log^* |E_i|$ is the binary encoding length of $|E_i|$, and $|g_i| H(g_i)$ is the shortest description of the i-th node cluster $g_i$, $$|g_i| = \frac{n_i(n_i - 1)}{2}, \quad H(g_i) = -(\rho_i \log_2 \rho_i + (1 - \rho_i) \log_2 (1 - \rho_i)), \quad \rho_i = \frac{|E_i|}{|g_i|},$$

if $n_i$=1, $\log^* |E_i| + |g_i| H(g_i)$ is 0;

(23) storing the node cluster swarm $S_0$ and the corresponding cost value CS as a node cluster division result,

(24) selecting two node clusters in which inter-cluster interactions take place among the nodes from the node cluster swarm $S_0$, consolidating the two node clusters into a new node cluster to form a new node cluster swarm Si, and calculating the corresponding cost value CSi of the new node cluster swarm Si according to the above formula,

(25) selecting one by one all different new node cluster swarms possibly formed from the node cluster swarm $S_0$ according to the principle of selecting two node clusters in which inter-cluster interactions take place among the nodes for consolidation, calculating the cost values thereof respectively, and selecting the new node cluster swarm corresponding to the minimum cost value to replace the node cluster swarm $S_0$, wherein if there are multiple new node cluster swarms having the same minimum cost value, one of them is selected randomly to replace the node cluster swarm $S_0$,

(26) determining whether a new node cluster swarm can be formed by consolidating node clusters in the node cluster swarm $S_0$ according to the above selection principle after being replaced with the new node cluster swarm corresponding to the minimum cost value, if yes, returning to (23), and otherwise, proceeding to (27),

(27) storing the node cluster swarm $S_0$ and the corresponding cost value CS as a node cluster division result, and

(28) finding by the control node the node cluster swarm $S_0$ corresponding to the minimum cost value from the node cluster division results as the optimal node cluster swarm that is finally selected and selecting supernodes from each node cluster in the optimal node cluster swarm, wherein nodes that have more interactions with other nodes and better performance are selected as supernodes in each node cluster.

2. The method according to claim 1, wherein in (2), the control node divides the nodes into a plurality of node clusters comprises:
encoding different division results for node clusters possibly formed in the network through lossless compression; and
selecting the division result that has the shortest encoding length as the optimal division result.

3. The method according to claim 1, wherein in the new node cluster swarm $S_i$ corresponding to the minimum cost value selected in (26), close interactions take place among the nodes in the same node cluster, and little or even no interactions take place among the nodes in different node clusters; and
once the control node finds the node cluster swarm $S_0$ corresponding to the minimum cost value from the node cluster division results as the optimal node cluster swarm, it indicates that all the non-control nodes have been divided in the optimal way according to the interactions among the nodes.

4. The method according to claim 1, wherein the performance of a node in (28) is indicated by at least one of the following parameters CPU frequency and memory capacity, transmission width, delay, online time, total traffic with other nodes per minute, average CPU utilization ratio and average memory utilization ratio during a predetermined period of time.

5. The method according to claim 1, wherein when calculating the number of interactions between a node and other nodes in (28), the number of control interactions between the node and the original supernodes is excluded.

6. The method according to claim 1, wherein durations of the two set periods T2 and T1 are adjusted dynamically separately according to actual conditions of the interactions among the nodes in the network to avoid an increase in traffic of the network when the periods are set too short and avoid that the interaction change among the nodes cannot be reflected in time when the periods are set too long.

7. The method according to claim 6, wherein durations of the two set periods T2 and T1 are adjusted dynamically based on shortest description principle, comprising:
dividing node clusters in two optimal node cluster swarms at adjacent points of time into dynamic groups to form different dynamic group swarms possibly;
taking the division result corresponding to the shortest binary encoding length as the optimal dynamic group swarm; and
determining whether change tendencies of the node clusters in the dynamic groups of the optimal dynamic group swarm are consistent with each other at adjacent points of time; if yes, it is indicated that the change is smaller and the two set periods T2 and T1 are prolonged properly, and otherwise, the two set periods T2 and T1 are shortened properly.

8. The method according to claim 6, wherein durations of the two set periods T2 and T1 are adjusted by:
(A) selecting by the control node two optimal node cluster swarms S01 and S02 at two adjacent points of time which differs from each other by only one of the second set period T2, respectively, wherein S01 is the optimal node cluster swarm at an earlier point of time and S02 is the optimal node cluster swarm at a later point of time;
(B) according to node overlap conditions of the two optimal node cluster swarms S01 and S02 at the adjacent points of time, dividing by the control node the node clusters included in the optimal node cluster swarms S01 and S02 into a plurality of dynamic groups based on the principle of shortest description, wherein each node cluster belonging uniquely to a dynamic group, and all the dynamic groups form the optimal dynamic group swarm; and
(C) calculating by the control node the average updating period of the optimal dynamic group swarm and updates the two set periods T2 and T1.

9. The method according to claim 8, wherein B comprises:
(B1) making, by the control node, each node cluster in the optimal node cluster swarms S01 and S02 be a respective dynamic group independently to initially form a dynamic group swarm $D_0$;
(B2) calculating the cost value CD of the dynamic group swarm $D_0$ according to the formula $$CD = \log^* r + \log^* m + \log^* q + (m+r)H(s) + \sum_{i=1}^{q}(\log^* E(b_i) + |V_i^1| \times |V_i^2|H(b_i)),$$

where r and m are the total numbers of node clusters in the optimal node cluster swarms S01 and S02, respectively; q is the number of dynamic groups in the dynamic group swarm $D_0$; log*r, log*m and log*q are binary encoding lengths of r, m and q, respectively, calculated according to the formula $$\log^* x = \sum_{j=1} X(j), \quad X(1) = \log_2 x, \quad X(j+1) = \log_2 X(j), \quad X(j) > 0,$$

and j is a natural number; (m+r)H(s) is the binary encoding length of the dynamic group to which each node cluster belongs, $$H(s) = -\sum_{i=1}^{q} s_i \log_2 s_i, \quad s_i = \frac{r_i}{m+r},$$

$r_i$ is the total number of node clusters in the optimal node cluster swarms S01 and S02 included in the i-th dynamic group $b_i$ in the dynamic group swarm $D_0$, and $s_i$ is the probability that a node cluster belongs to the i-th dynamic group $b_i$; $E(b_i)$ is the number of pairs of node clusters that have nodes overlapping with each other at adjacent points of time in the i-th dynamic group $b_i$ in the dynamic group swarm $D_0$, and log*$E(b_i)$ is the binary encoding length of $E(b_i)$; and $|V_i^1| \times |V_i^2|H(b_i)$ is the shortest description of the i-th dynamic group $b_i$, $|V_i^1|$ is the number of node clusters belonging to the optimal node cluster swarm S01 in the i-th dynamic group $b_i$, $|V_i^2|$ is the number of node clusters belonging to the optimal node cluster swarm S02 in the i-th dynamic group $b_i$, $H(b_i) = -(\alpha_i \log_2 \alpha_i + (1-\alpha_i)\log_2(1-\alpha_i))$ and $$\alpha_i = \frac{E(b_i)}{|V_i^1| \times |V_i^2|};$$

if $r_i=1$, log*$E(b_i)+|V_i^1|\times|V_i^2|H(b_i)$ is 0;

(B3) storing the dynamic group swarm $D_0$ and the corresponding cost value CD as a dynamic group division result;

(B4) selecting arbitrarily two dynamic groups which share at least one node therebetween from the dynamic group swarm $D_0$, consolidating the dynamic groups into a new dynamic group to form a new dynamic group swarm Di, and calculating the cost value CDi of the new dynamic group swarm Di according to the above formula;

(B5) selecting one by one all new dynamic group swarms possibly formed from the dynamic group swarm $D_0$ according to the principle of selecting two dynamic groups which share at least one node therebetween for consolidation, calculating the cost values thereof respectively, and selecting the new dynamic group swarm corresponding to the minimum cost value to replace the dynamic group swarm $D_0$, wherein if there are multiple new dynamic group swarms having the same minimum cost value, one of them is selected randomly to replace the dynamic group swarm $D_0$;

(B6) determining whether a new dynamic group swarm can be formed by consolidating dynamic groups in the dynamic group swarm $D_0$ according to the above selection principle after being replaced with the new dynamic group swarm corresponding to the minimum cost value, if yes, returning to (B3), and otherwise, proceeding to (B7);

(B7) storing the dynamic group swarm $D_0$ and the corresponding cost value CD as a dynamic group division result; and (B8) finding by the control node the dynamic group swarm $D_0$ corresponding to the minimum cost value from the dynamic group division results as the optimal dynamic group swarm that is finally selected and determines whether to update the two periods T2 and T1, according to the dynamic change tendency of interactions among all nodes in the optimal dynamic group swarm at adjacent points of time.

10. The method according to claim 8, wherein C comprises:

(C1) selecting arbitrarily a dynamic group di from the optimal dynamic group swarm that is finally selected;

(C2) determining whether the dynamic group di is in a holding state according to node overlap conditions of node clusters at adjacent points of time included in the dynamic group di, if yes, setting the updating period of the dynamic group di as 2×T2, and otherwise, setting the updating period of the dynamic group di as T2;

(C3) determining whether all dynamic groups di have been selected from the optimal dynamic group swarm and whether the above operations have been performed thereon, if yes, proceeding to (C4), and otherwise, selecting an unselected dynamic group di from the optimal dynamic group swarm and returning to (C2);

(C4) calculating the average updating period of the optimal dynamic group swarm from the updating periods of all the dynamic groups; and (C5) adjusting values of the two set periods T1 and T2 according to the average updating period L of the optimal dynamic group swarm; if L<2×T2, the period T2 is shortened, and otherwise, the period T2 is lengthened, and updating the first set period T1 according to the relationship between T2 and T1 that T2 is an integral multiple of T1.

11. The method according to claim 10, wherein determining whether the dynamic group di is in a holding state in (C2) comprises:

(C21) calculating the maximum number of overlapping nodes between the node clusters at the earlier point of time and those at the later point of time in the dynamic group di;

(C22) calculating a first ratio B1 of maximum number of overlapping nodes for the node clusters at the earlier point of time in the dynamic group di, wherein the first ratio B1 is a quotient obtained by dividing the maximum number of overlapping nodes by the total number of nodes in the node clusters at the earlier point of time in the dynamic group di;

(C23) calculating a second ratio B2 of maximum number of overlapping nodes for the node clusters at the later point of time in the dynamic group di, wherein the second ratio B2 is a quotient obtained by dividing the maximum number of overlapping nodes by the total number of nodes in the node clusters at the later point of time in the dynamic group di; and (C24) determining whether both of B1 and B2 are greater than a threshold; if yes, it is indicated that the dynamic group di is in a holding state, and the updating period thereof is set to be 2×T2, and otherwise, it is indicated that the dynamic group di is in a changing state, and the updating period thereof is set to be T2, wherein the threshold is a real number selected from an interval [0,1] as required by the system.

12. The method according to claim 10, wherein the period T2 is shortened in (C5), the period T2 is calculated based on the following formula T2=$\phi$×T2, where $\phi$ is a real number selected from an interval [0,1] ; and when the period T2 is lengthened, the period T2 is calculated based on the following formula T2=$\tau$×T2, where $\tau$ is a real number larger than 1.

* * * * *